(12) United States Patent
Chen et al.

(10) Patent No.: US 11,487,096 B2
(45) Date of Patent: Nov. 1, 2022

(54) QUANTITATIVE PHASE IMAGING METHOD BASED ON DIFFERENTIAL PHASE CONTRAST WITH OPTIMAL LIGHTING PATTERN DESIGN

(71) Applicant: Nanjing University of Science and Technology, Jiangsu (CN)

(72) Inventors: Qian Chen, Nanjing (CN); Chao Zuo, Nanjing (CN); Yao Fan, Nanjing (CN); Jiasong Sun, Nanjing (CN); Jiaji Li, Nanjing (CN); Shijie Feng, Nanjing (CN); Yuzhen Zhang, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 4 days.

(21) Appl. No.: 17/294,322

(22) PCT Filed: Jul. 5, 2019

(86) PCT No.: PCT/CN2019/094885
§ 371 (c)(1),
(2) Date: May 14, 2021

(87) PCT Pub. No.: WO2020/107893
PCT Pub. Date: Jun. 4, 2020

(65) Prior Publication Data
US 2021/0325654 A1 Oct. 21, 2021

(30) Foreign Application Priority Data

Nov. 28, 2018 (CN) .......................... 201811434077.4

(51) Int. Cl.
*G02B 21/14* (2006.01)
*G02B 21/36* (2006.01)
(Continued)

(52) U.S. Cl.
CPC ........... *G02B 21/14* (2013.01); *G02B 21/365* (2013.01); *H04N 5/2354* (2013.01); *H04N 5/23229* (2013.01); *G06T 7/0004* (2013.01)

(58) Field of Classification Search
CPC ...... G02B 21/14; G02B 21/365; G02B 21/06; H04N 5/23229; H04N 5/2354; G06T 7/0004
(Continued)

(56) References Cited

U.S. PATENT DOCUMENTS 2,195,748 A * 4/1940 Leber ........................ G01J 1/40
356/235
4,241,456 A * 12/1980 Nakagaki ............... G08C 23/04
398/208
(Continued)

FOREIGN PATENT DOCUMENTS

CN 102279048 A 12/2011
CN 103460251 A 12/2013
(Continued)

OTHER PUBLICATIONS

Dekkers et al., "Differential Phase Contrast in a STEM", OPTIK, vol. 41 (No. 4), (1974), pp. 452-456.
(Continued)

*Primary Examiner* — Frank F Huang
(74) *Attorney, Agent, or Firm* — Birch, Stewart, Kolasch & Birch, LLP (57) ABSTRACT

The patent discloses a differential phase contrast (DPC) quantitative phase microscopy method based on the optimal illumination pattern design. Firstly, the optimal illumination pattern corresponding to the isotropic phase transfer function of DPC quantitative phase imaging is derived, which is determined as a semi-annular illumination pattern with the illumination numerical aperture $NA_{ill}$ equal to the numerical
(Continued)

aperture $NA_{obj}$ of the objective lens. The illumination intensity distribution varies with the cosine of the illumination angle, and it can be expressed as $S(\theta)=\cos(\theta)$. This patent effectively compensates for the frequency loss of phase transfer, not only the high-frequency responses of PTF are enhanced, but also the transfer responses of low-frequency phase information is significantly improved. As a result, the optimal illumination scheme ensures the correctness and achieves high resolution phase reconstruction, while the number of illuminations is reduced to a minimum of two, which greatly increases the imaging speed, allowing for real-time dynamic, high-correctness, high-resolution phase imaging results.

6 Claims, 5 Drawing Sheets

(51) Int. Cl.
  *H04N 5/232* (2006.01)
  *H04N 5/235* (2006.01)
  *G06T 7/00* (2017.01)
(58) Field of Classification Search
  USPC .......................................................... 348/79
  See application file for complete search history.

(56) References Cited

U.S. PATENT DOCUMENTS

| | | | | | |
|---|---|---|---|---|---|
| 4,547,057 | A | * | 10/1985 | Kataoka | G03B 15/05 396/157 |
| 4,801,964 | A | * | 1/1989 | Desormeaux | G03B 7/16 396/106 |
| 5,159,381 | A | * | 10/1992 | Harrison | H05B 41/325 396/156 |
| 6,389,232 | B2 | * | 5/2002 | Ishihara | G03B 7/09979 396/233 |
| 6,525,763 | B1 | * | 2/2003 | Maeda | H04N 1/4092 348/96 |
| 6,564,014 | B1 | * | 5/2003 | Takeuchi | G03B 15/05 396/233 |
| 6,724,419 | B1 | * | 4/2004 | Green | G02B 21/367 348/79 |
| 6,734,894 | B1 | * | 5/2004 | Higuchi | H04N 7/183 348/69 |
| 7,295,765 | B1 | * | 11/2007 | Kijima | H04N 5/772 386/326 |
| 7,489,333 | B2 | * | 2/2009 | Dobashi | A61B 3/14 348/78 |
| 7,697,199 | B2 | * | 4/2010 | Reimer | A61B 3/13 359/385 |
| 8,045,002 | B2 | * | 10/2011 | Gladnick | H04N 5/2354 348/132 |
| 10,082,653 | B1 | | 9/2018 | Liu et al. | |
| 2002/0034067 | A1 | * | 3/2002 | Massaro | G06F 3/147 361/728 |
| 2003/0136832 | A1 | * | 7/2003 | Massaro | A47F 5/0068 235/383 |
| 2004/0195774 | A1 | * | 10/2004 | Segan | G04B 47/048 273/359 |
| 2007/0049159 | A1 | * | 3/2007 | Kulis | A63H 17/28 446/438 |
| 2007/0103890 | A1 | * | 5/2007 | Morehead | A01K 27/006 362/103 |
| 2007/0164115 | A1 | * | 7/2007 | Joseph | G06K 7/10722 235/462.25 |
| 2007/0228755 | A1 | * | 10/2007 | Alvarado | B62D 41/00 340/425.5 |
| 2008/0165211 | A1 | * | 7/2008 | Shoji | G09G 3/2927 345/690 |
| 2009/0122087 | A1 | * | 5/2009 | Maruyama | G09G 3/3611 345/102 |
| 2009/0135172 | A1 | * | 5/2009 | Shoji | G09G 3/2927 345/212 |
| 2011/0063623 | A1 | | 3/2011 | Cui et al. | |
| 2015/0294128 | A1 | * | 10/2015 | Kawashima | G06K 7/10544 235/454 |
| 2016/0125178 | A1 | * | 5/2016 | Danikhno | H04L 63/0861 726/18 |
| 2016/0378266 | A1 | * | 12/2016 | Lu | G06K 9/00543 345/175 |
| 2017/0045617 | A1 | * | 2/2017 | Masuda | G01S 17/88 |
| 2017/0061210 | A1 | * | 3/2017 | Ollila | H04N 5/2256 |
| 2017/0131088 | A1 | * | 5/2017 | Masuda | G02B 7/40 |
| 2017/0277950 | A1 | * | 9/2017 | Sung | G06V 40/18 |
| 2017/0289421 | A1 | * | 10/2017 | Tan | H04N 5/2352 |
| 2018/0189547 | A1 | * | 7/2018 | Daniels | G06V 40/16 |
| 2019/0313009 | A1 | * | 10/2019 | Alameh | H04N 1/2125 |
| 2020/0142192 | A1 | * | 5/2020 | Kim | G02B 27/0149 |
| 2020/0209604 | A1 | | 7/2020 | Chen et al. | |
| 2021/0325654 | A1 | * | 10/2021 | Chen | G02B 21/365 |

FOREIGN PATENT DOCUMENTS

| | | |
|---|---|---|
| CN | 105403508 A | 3/2016 |
| CN | 105403988 A | 3/2016 |
| CN | 107024763 A | 8/2017 |
| CN | 107272178 A | 10/2017 |
| CN | 107290846 A | 10/2017 |
| CN | 109375358 A | 2/2019 |
| JP | 2-197050 A | 8/1990 |
| WO | WO 2014/070082 A1 | 5/2014 |

OTHER PUBLICATIONS

International Search Report for PCT/CN2019/094885 (PCT/ISA/210) dated Sep. 25, 2019.

Shibata et al., "Differential phase-contrast microscopy at atomic resolution", Nature Physics, Letters, vol. 8, Aug. 2012, www.nature.com/naturephysics, pp. 611-615.

* cited by examiner

Step 1, design optimal illumination pattern: the lighting pattern corresponding to the isotropic PTF in DPC QPI is derived. It is a semi-annular lighting with the lighting NA equal to the objective NA, and its lighting intensity varies with the angle of lighting according to the cosine.

Step 2, capture original images under optimal illumination: computer-controlled LCD or high-density programmable LED arrays are used to display four optimal lighting patterns under two-axis lighting to acquire four images.

Step 3, calculate phase contrast image: according to the formula for DPC imaging, the phase gradient image of the sample in the left-right and up-down directions are calculated under optimal lighting.

Step 4, solve the phase transfer function (PTF): based on weak phase approximation, the PTF for optimal lighting DPC QPI is solved.

Step 5, solve the quantitative phase of the sample: perform deconvolution (Tikhonov criterion) using the two-axis PTF and the phase gradient spectrums to obtain the final reconstructed quantitative phase result.

QUANTITATIVE PHASE IMAGING METHOD BASED ON DIFFERENTIAL PHASE CONTRAST WITH OPTIMAL LIGHTING PATTERN DESIGN

TECHNICAL FIELD

This invention belongs to optical microscopic imaging and measurement technology, in particular, a differential phase contrast quantitative phase imaging method based on the optimal lighting pattern design.

BACKGROUND TECHNOLOGY

Due to the weak absorption of biological cells, label-free imaging has been a hot topic in microscopic imaging methods. Quantitative phase imaging (QPI) techniques have gradually become the main tool for cell research. In recent years, a variety of quantitative phase imaging techniques have been proposed, and they tend to have different imaging performances in terms of imaging resolution, imaging throughput, and imaging speed. Among these imaging methods, differential phase contrast (DPC) quantitative phase imaging (QPI) only requires a few original images to achieve the quantitative phase recovery, not only achieves twice the lateral resolution of the diffraction limit of the objective lens, but also makes the imaging results have high correctness and stability. These advantages make DPC QPI extremely promising for cellular imaging applications.

DPC converts the invisible specimen phase into measurable intensity information by asymmetrical lighting. In recent years, new light sources, such as programmable LED arrays and LCD displays, have been introduced into microscopic imaging systems, making the lighting method flexible and adjustable. This greatly promotes the development of DPC, and some new DPC imaging mechanisms have been proposed. For example, Tian et al. proposed DPC QPI and successfully used DPC to observe the quantitative phase distribution of unlabeled cells (Tian, L., & Waller, L. (2015). Quantitative differential phase contrast imaging in an LED array microscope. Optics express, 23(9), 11394-11403). In LED-based DPC methods, four images are usually acquired using asymmetric semi-circular lighting patterns in two axes. These images are used to calculate phase gradient images in the two directions, and then obtain the quantitative phase of the specimen by deconvolution. Since only a few acquisition images are required, DPC offers great advantages for live cell imaging applications. However, the phase transfer function (PTF) obtained from the semi-circular lighting exhibits poor transfer response, which makes it difficult to achieve the desired maximum resolution and stable phase contrast. Moreover, the semi-circular lighting corresponds to non-uniform PTF distribution, which results in the phase results with artifacts and errors due to the absence of some frequencies in the case of two-axis lighting.

In order to improve the PTF of DPC imaging, new lighting methods have been investigated to enhance the transfer response of the PTF of DPC QPI. In 2015, a DPC method based on multi-axis lighting for ideal symmetry of the PTF (Tian, L., & Waller, L. (2015). Quantitative differential phase contrast imaging in an LED array microscope. Optics express, 23(9), 11394-11403) obtained isotropic PTF by illuminating the specimen with 12 different axes. Although this multi-axis approach can obtain isotropic PTF, the transfer response of the low-frequency component is still too poor to obtain a high phase contrast. Moreover, 12-axis lighting greatly increases the number of acquired images, which will obstacle the imaging speed of DPC. In order to obtain isotropic PTF with fewer lighting axes, a new lighting of DPC with radial lighting (Lin, Y. Z., Huang, K. Y, & Luo, Y. (2018). Quantitative differential phase contrast imaging at high resolution with radially asymmetric illumination. Optics letters, 43(12), 2973-2976) is proposed to obtain an optimized PTF. However, the PTF obtained in this method is not strictly isotropic, and the low-frequency component is still very poor. Subsequently, a new embedded amplitude gradient mask has been proposed to encode the lighting (Chen, H. H., Lin, Y. Z., & Luo, Y. (2018). Isotropic differential phase contrast microscopy for quantitative phase bio-imaging. Journal of biophotonics, 11(8), e201700364). However, the problem of missing phase low-frequency information remains unresolved. Overall, the optimal lighting pattern corresponding to the strictly isotropic PTF is still not available in the existing methods.

CONTENT OF THE INVENTION

The purpose of this invention is to provide a real-time dynamic, high-correctness, high-resolution DPC QPI microscopy under optimal lighting pattern to solve the problems of serious missing of partial frequency information, slow imaging speed, and noise sensitivity of the system in DPC QPI.

The technical solution of this invention is a method of DPC QPI based on the optimal lighting pattern design with the following process:

Step 1, design optimal lighting pattern: firstly, the lighting pattern corresponding to the isotropic phase transfer function (PTF) in DPC QPI is derived, which is considered to be the optimal lighting pattern. Specifically, the optimal lighting pattern is semi-annular lighting with the lighting numerical aperture (NA) $N_{ill}$ equal to the objective NA $NA_{obj}$. Consider the NA of the objective is expressed as $NA_{obj}$, the distance between the single LED on lighting annulus and the light axis is d, and the angle between the light emitted by a single LED and the optical axis is $α_i$, then the lighting $NA_{ill}$ obtained by the LED on the annular pattern satisfies the following equation:

$$NA_{ill} = \sin α_i = \sin(\arctan\frac{d}{h}) = NA_{obj}$$

The lighting intensity distribution of the optimal lighting pattern varies with the angle of lighting according to the cosine, and the expression in polar coordinates can be expressed:

$S(θ)=\cos(θ)$ where the angle θ increases in a clockwise direction.

Step 2, capture original images under optimal lighting: computer-controlled LCD or high-density programmable LED arrays are used to display four optimal lighting patterns under two-axis lighting, and generate synchronous trigger signals to the camera to acquire an image under each pattern, thus a total of four original images are recored, i.e., $I_l$, $I_r$, $I_u$, and $I_d$. Here, $I_l$ and $I_r$ represent two images in the left and right axis directions, and $I_u$ and $I_d$ represent two images in the up and down axis directions.

Step 3, calculate phase gradient image: according to the formula for DPC imaging, the phase gradient image of the specimen in the left-right direction $I_{lr}=(I_l-I_r)/(I_l+I_r)$ and the up-down direction $I_{ud}=(I_u-I_d)/(I_u+I_d)$ calculated under optimal lighting.

Step 4, solve the phase transfer function (PTF) corresponding to the optimal lighting pattern: derive the PTFs $PTF_{lr}(u)$ and $PTF_{ud}(u)$ in the two axis directions in the optimal lighting pattern DPC system based on the weak phase approximation condition.

Step 5, solve the quantitative phase of the sample: perform deconvolution (Tikhonov criterion) using the two-axis PTF and the corresponding phase gradient images to obtain the final reconstructed quantitative phase results.

Compared with the existing methods, the method proposed in this invention has the following advantages: (1) The PTF corresponding to the optimal lighting pattern is isotropic. In the polar coordinate system, let $r_a$ be the distance from any point to the center zero frequency in the PTF distribution, and $r_{NA}$ be the distance from the cut-off frequency to the center zero frequency in the frequency domain under the partially coherent imaging, then the PTF in the left-right direction is obtained as follows $$PTF_{lr}(u) = PTF_{lr}(r, \theta) = 2\sqrt{1 - \frac{r_a^2}{r_{NA}^2}} \cos\theta$$

The PTF in the up-down direction is:

$$PTF_{ud}(u) = PTF_{ud}(r, \theta) = 2\sqrt{1 - \frac{r_a^2}{r_{NA}^2}} \cos\theta$$

Their intensity distribution is expressed as:

$$|PTF_{lr}(r, \theta)|^2 + |PTF_{ud}(r, \theta)|^2 = 4 - \frac{r_a^2}{r_{NA}^2}$$

It can be seen that the transfer response of each frequency component of the PTF is independent of the angle and only related to the frequency, which indicates that the phase transfer characteristics of DPC QPI is isotropic. Compared with the conventional semi-circular lighting, not only the transfer performance of the high frequency phase is enhanced, but also the low-frequency phase can be effectively recovered, ensuring the correctness, information integrity and high resolution of the phase recovery results. (2) From the perspective of imaging speed, the design of the optimal lighting pattern reduces the number of lighting axes of isotropic PTF to a minimum of two-axis lighting, which greatly reduces the number of acquired images required for DPC QPI. This allows DPC QPI to achieve real-time dynamic high-resolution QPI. (3) From the perspective of sensitivity to noise, the optimal lighting pattern greatly enhanced the low and high frequency responses of the PTF, which relaxes the sensitivity of the imaging results to noise, allowing the correct quantitative phase to be obtained with essentially no consideration of regularization. (4) From the perspective the implementation process, the optimal lighting pattern not only ensures the information integrity of the DPC QPI, but also enhances the phase gradient in all directions.

FIGS. 2(*a*1), 2(*a*2), 2(*a*3) show the individual lighting patterns at different angles. FIGS. 2(*b*1), 2(*b*2), 2(*b*3) are the corresponding PTFs; FIGS. 2(*c*1), 2(*c*2), 2(*c*3), 2(c4), 2(c5), 2(c6) show the different DPC lighting patterns, and FIGS. 2(*d*1), 2(*d*2), 2(*d*3), 2(*d*4), 2(*d*5), 2(*d*6) are the corresponding PTFs.

FIGS. 4(*a*1), 4(*a*2), 4(*a*3), and 4(*a*4) denote the four lighting patterns of conventional semi-circular lighting, radial lighting, amplitude gradient mask lighting, and optimal lighting, respectively; FIGS. 4(*b*1), 4(*b*2), 4(*b*3), and 4(*b*4) are the PTFs in the up-down direction corresponding to each lighting pattern. FIGS. 4 (*c*1), 4(*c*2), 4(*c*3), 4(*c*3) are the PTFs in the left-right direction; FIGS. 4(*d*1), 4(*d*2), 4(*d*3), 4(*d*4) are the intensity distributions of the PTFs; FIGS. 4(*e*1), 4(*e*2), 4(*e*3), 4(*e*4) plotted the response curves of PTFs at the five frequency positions NA/4, NA/2, NA, 3 NA/2, and 7 NA/4.

FIGS. 5(*a*1), 5(*a*2), 5(*a*3) and 5(*a*4) show the quantitative phase results with regularization parameter of 0 under four lightings, i.e., conventional semi-circular lighting, radial lighting, amplitude gradient mask lighting and optimal lighting. FIGS. 5(*b*1), 5(*b*2), 5(*b*3), 5(*b*4) indicate the quantitative phase results obtained at regularization parameter of 0.1. FIGS. 5(*c*1), 5(*c*2), 5(*c*3), 5(*c*4) indicate the quantitative phase results obtained at regularization parameter of 0.2. FIG. 5(*d*) indicates the distribution curves of the quantitative phase results at different frequency components under four lighting patterns.

SPECIFIC IMPLEMENTATION

The actual hardware platform of this invention is a microscopic imaging system based on a high-density programmable LED array or LCD display. The entire system includes an industrial camera for image acquisition, a microscope objective, a sample, a carrier table, and a programmable LED array or LCD display as the microscope lighting source. The LED array or LCD display is positioned under the carrier table at a spacing H typically between 20-100 mm and centered on the optical axis of the microscope system. The LED array or LCD display includes a number of point light sources, which are regularly aligned to form a two-dimensional matrix. Each point source can be illuminated in red, green, and blue, with typical wavelengths of 635 nm for red, 525 nm for green, and 475 nm for blue. Each point source has a typical center spacing d of 1-10 mm, and the LED array or LCD display is fixed in position by a fixed substrate.

If LED arrays are used for lighting, the implementation circuit to drive the LED arrays to light each of the point sources can be used existing technologies such as microcontrollers, ARM, or programmable logic devices. The specific implementation method can be found in related paper (Guo, Bao-Zeng, and Chun-Miao Deng. "Design of LED Display Control System Based on FPGA." Chinese Journal of Liquid Crystals and Displays 25.3 (2010): 424-428).

If the LCD display is used for lighting, it requires the microscope's own halogen lamp and other light sources at the bottom of the LCD display to provide raw lighting, and the LCD is introduced to replace the aperture diaphragm of condenser lens. By displaying different patterns as the spatial light filter, the lighting is modulated to different shapes and color distribution. The technology used in the driving circuit of LCD is basically the same as the LED array, and the specific implementation method can be referred to the related literature 201510631692.4.

Figure 1:
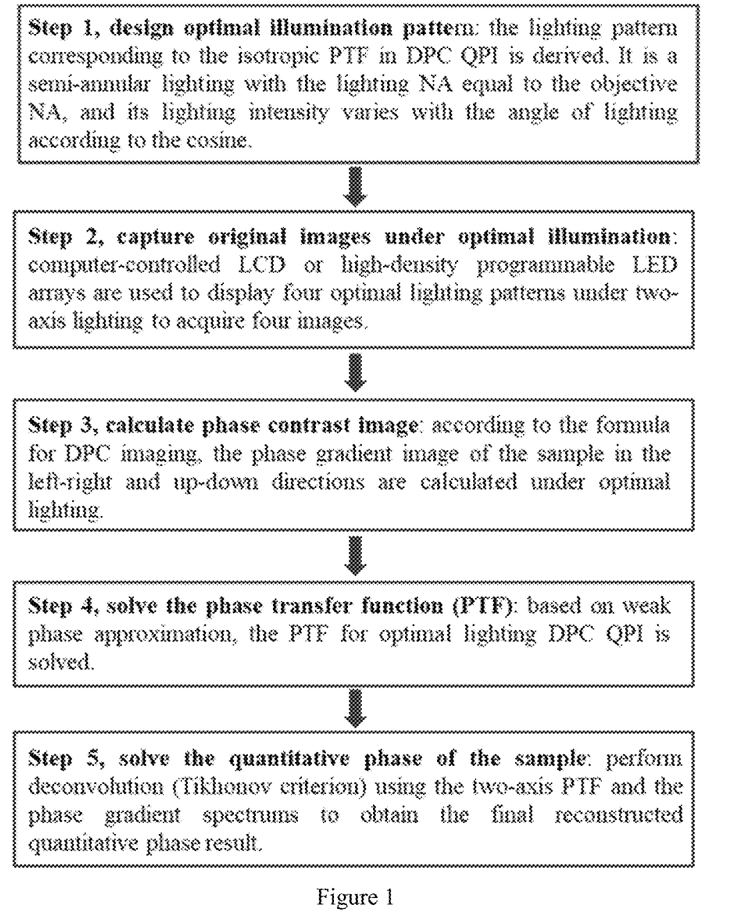
FIG. 1 shows the flow chart of the DPC QPI method based on the optimal lighting pattern design.

From FIG. 1, the steps of DPC QPI under optimal lighting pattern design are as follows:

Step 1, design optimal lighting pattern

The design of the optimal lighting pattern for DPC QPI is to derive the lighting pattern of the isotropic PTF. It can be divided into the following two major steps, that is, for the determination of the optimal lighting shape and the lighting intensity distribution.

Figure 2:
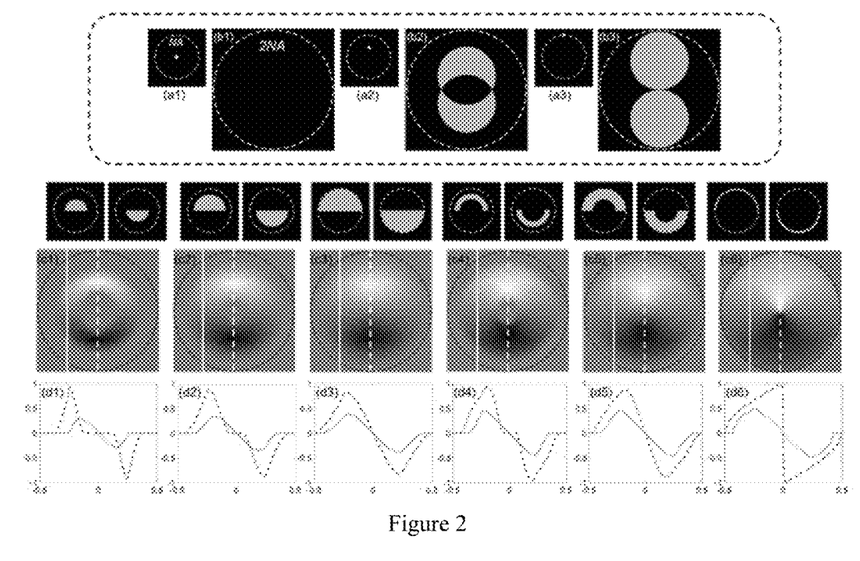
FIG. 2 shows the simulation results of the PTF under different lighting apertures.

(1) The shape of the optimal lighting pattern is determined by the following derivation process:

First, the outer diameter of the optimal lighting pattern is determined, i.e., the maximum lighting angle. In order to research the relationship between the lighting shape and the PTF, the PTF under different aperture lightings are simulated. FIGS. 2($a$1)-2($a$3), 2($b$1)-2($b$3) show the single LED lighting pattern at different angles and their PTFs. It can be seen that as the lighting angle increases, the corresponding phase shift of the PTF increases, and the offset region becomes smaller. When the NA of the lighting determined by the maximum lighting angle is equal to the objective lens NA, the two apertures of the PTF exactly tangent to each other. In this case, the low-frequency component will have the optimal transfer characteristics.

Next, the inner diameter of the optimal lighting pattern is further determined by analyzing the PTF. In FIGS. 2($c$1)-2($c$6), we show PTFs under different DPC lighting patterns. It can be seen that as the radius of the semi-circular lighting increases [FIGS. 2($c$1)-2($c$3)], the covered area of the PTF becomes wider, which indicates that the PTF performance are optimized. However, most of the low-frequency components have a response of 0, which makes its contrast in the low-frequency components very poor. As shown in FIGS. 2($c$4)-2($c$6), the PTF has better low-frequency imaging performance under annular lighting. When the NA of the annulus lighting is tangent to the NA of the objective, the PTF responses at low central zero frequencies and high frequencies approaching to the diffraction limit are greatly enhanced. As a result, the low-frequency contrast of the reconstructed phase will be greatly enhanced, while the phase resolution (corresponds to the high frequency components) will be improved to the resolution of incoherent diffraction limit.

Based on the above analysis, it can be determined that the shape of the optimal lighting pattern in DPC should be semi-annular lighting, and its NA of the lighting $NA_{ill}$ should be equal to the NA of the objective lens $NA_{obj}$. The transfer response of any lighting intensity distribution will be enhanced when such a semi-annular lighting is adopted. Thus, it can be determined that if the NA of the objective used for DPC QPI is $NA_{obj}$, the radius of the optimal lighting annulus is d, the distance between the LEDs and the specimen is h, and the angle between the light emitted by a single LED and the optical axis is $\alpha_i$. The optimal lighting pattern should be satisfy:

$$NA_{ill} = \sin\alpha_i = \sin(\arctan\frac{d}{h}) = NA_{obj}$$

(2) The process of determining the intensity distribution of the optimal lighting pattern is as follows:

In polar coordinates, the PTF is defined as PTF $(r,\theta)$, where r denotes the distance from a point to the center point of the PTF distribution, θ denotes the angle between the point and the axis direction. Achieving an isotropic PTF requires a minimum of two axes of lighting, and they are required to satisfy:

$$|PTF_{lr}(r,\theta)|^2 + |PTF_{ud}(r,\theta)|^2 C_r$$

where $PTF_{lr}(r,\theta)$ and $PTF_{ud}(r,\theta)$ denote the PTFs in the left-right and up-down axis directions, respectively. $C_r$ is a constant only related to r.

In polar coordinates, the PTF is a periodic function, so it can perform the Fourier series expansion to yield the following expression:

$$PTF(r, \theta) = \sum_{n=1}^{\infty} [a_n\cos(n\theta) + b_n\sin(n\theta)]$$

where $a_n$ and $b_n$ in the coefficient terms independent of r and θ, and n is an arbitrary positive integer. To satisfy $|PTF_{lr}(r,\theta)|^2 + |PTF_{ud}(r,\theta)|^2 C_r$, $|PTF_{lr}(r,\theta)|^2$ and $|PTF_{ud}(r,\theta)|^2$ cannot produce any cross term, then the expression of $PTF_{lr}(r,\theta)$ can be obtained as follows:

$$PTF_{lr}(r,\theta)=a_n\cos(n\theta) \text{ or } PTF_{lr}(r,\theta)=b_n\sin(n\theta)$$

The two lighting axes of DPC are perpendicular to each other, so their PTFs differ by π/2 rad. Therefore, when $PTF_{lr}(r,\theta)=a_n\cos(n\theta)$, we will get $PTF_{ud}(r,\theta)=b_n\sin(n\theta)$, and when $PTF_{lr}(r,\theta)=b_n\sin(n\theta)$, we will get $PTF_{ud}(r,\theta)=a_n\cos(n\theta)$.

When using a light source with a lighting NA equal to the objective $NA_{obj}$, the intensity distribution of the light source is expressed as $S(\theta)$. In the polar coordinate system, $S(\theta)$ is required to satisfy three constraints: (a) $S(\theta)$ is an even function about the direction axis; (b) $S(\theta)$ is a periodic function about the angle θ; (c) $S(\theta)$ is symmetric about the point (π/2,θ).

Figure 3:
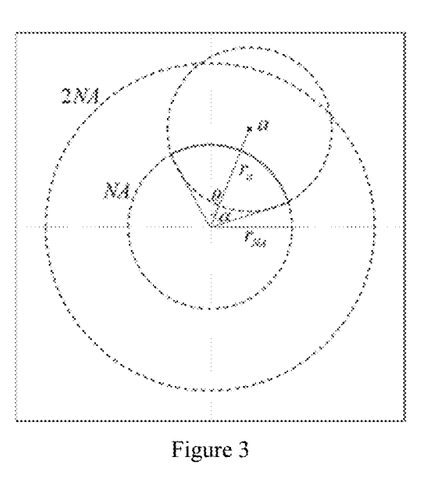
FIG. 3 shows the pattern of the lighting source in polar coordinates under optimal lighting.

The PTF response of any point can be obtained by integrating the lighting intensity corresponding to the red arc in FIG. 3 over the circular angle:

$$PTF_{lr}(r,\theta)=\int_{\theta-\alpha}^{\theta+\alpha}S(\theta)d\theta$$

α denotes half of the circular angle corresponding to the red arc. It can be obtained that:

$$S(\theta)=k_n\cos(n\theta)$$

where $k_n$ is an arbitrary constant. From this equation, the optimal lighting pattern is an annular lighting whose lighting intensity varies with the cosine of the lighting angle.

In the process of phase recovery, considering the minimum number of over-zero points, the intensity distribution of the optimal lighting pattern should be determined as:

$$S(\theta)=\cos(\theta)$$

here the angle β increases in a clockwise direction.

Step 2, capture original images under optimal lighting:

computer-controlled LCD or high-density programmable LED arrays are used to display four optimal lighting patterns under two-axis lighting, and generate synchronous trigger signals to the camera to acquire an image under each pattern, thus a total of four original images are recorded, i.e., $I_l$, $I_r$, $I_u$, and $I_d$. Here, $I_l$ and $I_r$ represent two images in the left and right axis directions, and $I_u$ and $I_d$ represent two images in the up and down axis directions.

LCD or high-density LED array can be used to generate the optimal lighting pattern. In the LCD-based system, the lighting system consists of the light source and LCD. The LCD is used to adjust the lighting pattern. In the LED-based system, the LED array is considered as the lighting source to directly display optimal lighting pattern by computer control.

Step 3: calculate phase gradient image:

According to the formula for DPC imaging, the phase gradient image of the specimen in the left-right direction $I_{lr}=(I_l-U_r)/(I_l+I_r)$ and the phase gradient image of the specimen in the up-down direction $I_{ud}=(I_u-I_d)/(I_u+I_d)$ are calculated under optimal lighting.

Step 4, solve the phase transfer function (PTF) of the optimal lighting pattern:

Based on the weak phase approximation, the PTFs in the two axis directions in the optimal lighting pattern DPC $PTF_{lr}(u)$ and $PTF_{ud}(u)$ are derived. Consider imaging a thin pure phase specimen with a complex transmittance function of $t(r)=e^{-a(r)+i\phi(r)}$, it is illuminated by a single angle tilted lighting of $S(u_j)$, where $r=(x, y)$ indicates the coordinates of the specimen plane, $\phi(r)$ represents the phase of the specimen. $u_j$ represents the phase shift corresponding to a single angular lighting in the frequency domain. In order to analyze the specimen phase and intensity independently, the weak phase approximation is introduced to simplify the complex amplitude distribution of the specimen as $t(r)=1+a(r)+i\Phi(r)$. Then, the Fourier transform of the complex amplitude distribution in the camera plane can be expressed as:

$$W_j(u)=\sqrt{S(u_j)}[\delta(u-u_j)-A(u-u_j)+i\Phi(u-u_j)]P(u)$$

u denotes the frequency component in the frequency domain, A(u) denotes the amplitude distribution of the specimen in the frequency domain, $\Phi(u)$ denotes the phase distribution of the specimen in the frequency domain. P(u) is the pupil function of the objective. The spectral distribution of the intensity image acquired by the camera under a single angular tilt lighting is obtained by convolving it with its conjugate term:

$$I_j(u)=W_j(u)\otimes W_j^*(u)=S(u_j)\delta(u)|P(u)|^2-S(u_j)A(u)[P^*(u_j)P(u+u_j)+P(u_j)P^*(u+u_j)]+iS(u_j)\Phi(u)[P^*(u_j)P(u+u_j)-P(u_j)P^*(u+u_j)]$$

Calculating the intensity distribution in the frequency domain under complex lighting, the intensity spectrum distribution can be divided into three terms (ignoring the higher-order convolution terms of the computational process):

$$I(u)=B\delta(u)+A(u)ATF(u)+i\Phi(u)PTF(u)$$

B represents the background term $B=\iint S(u_j)|P(u_j)|^2d^2u_j$; ATF (u) denotes the amplitude transfer function, and PTF(u) denotes the PTF. Where $$PTF(u)=\iint S(u_j)[P^*(u_j)P(u+u_j)-P(u_j)P^*(u-u_j)]d^2u_j$$

This is a general expression for the PTF under complex lighting, applicable to all lighting patterns light pupil functions.

DPC uses asymmetric lighting patterns in the up-down and left-right axis directions to illuminate the specimen, such that the tilted lighting introduces a phase factor that converts the invisible specimen phase into a measurable intensity. A simple differential calculation procedure is used to highlight the phase contrast of the specimen, and the corresponding PTF is expressed as:

$$PTF_{lr}(u)=\frac{\iint S_{lr}(u_j)[P^*(u_j)P(u+u_j)-P(u_j)P^*(u-u_j)]d^2u_j}{\iint |S_{lr}(u_j)||P(u_j)|^2 d^2u_j}$$

Where $PTF_{lr}(u)$ denotes the PTF in the left-right axis directions, $S_{lr}(u,)$ denotes the lighting in the left-right direction. The PTF in the up-down direction $PTF_{ud}(u)$ is derived as above process.

In the optimal lighting pattern, the PTF of DPC imaging is required be isotropic. In the polar coordinate system, let $r_a$ be the distance from any point to the center zero frequency in the PTF distribution, and $r_{NA}$ be the distance from the cut-off frequency to the center point in the frequency domain under the partially coherent imaging, then the PTF in the left-right direction is obtained as follows:

$$PTF_{lr}(u)=PTF_{lr}(r,\theta)=2\sqrt{1-\frac{r_a^2}{r_{NA}^2}}\cos\theta$$

The PTF in the up-down direction is $$PTF_{ud}(u)=PTF_{ud}(r,\theta)=2\sqrt{1-\frac{r_a^2}{r_{NA}^2}}\cos\theta$$

Their intensity distribution is obtained as $$|PTF_{lr}(r,\theta)|^2+|PTF_{ud}(r,\theta)|^2=4-\frac{r_a^2}{r_{NA}^2}$$

5. Step 5, solve the quantitative phase of the specimen:

Perform deconvolution (Tikhonov criterion) using the obtained two-axis PTF $PTF_{lr}(u)$ and $PTF_{ud}(u)$, and the corresponding phase gradient mage to obtain the final reconstructed quantitative phase results:

$$\phi(r)=F^{-1}\left\{\frac{\sum_i[PTF_i^{DPC*}(u)I_i^{DPC*}(u)]}{\sum_i|PTF_i^{DPC*}(u)|^2+\beta}\right\}$$

$\phi(r)$ is the reconstructed quantitative phase of the sample. The regularization parameter $\beta$ in this equation is used to suppress the error caused by excessive amplification by noise. In the optimal lighting pattern, since the PTF is greatly enhanced in entire partially coherent imaging range (from 0 to 2 $NA_{obj}$), the Tikhonov criterion can be calculated without considering the regularization parameter to obtain the anti-noise reconstructed quantitative phase. Thus, the regularization parameter $\beta$ is usually set as a very small or zero value.

Figure 4:
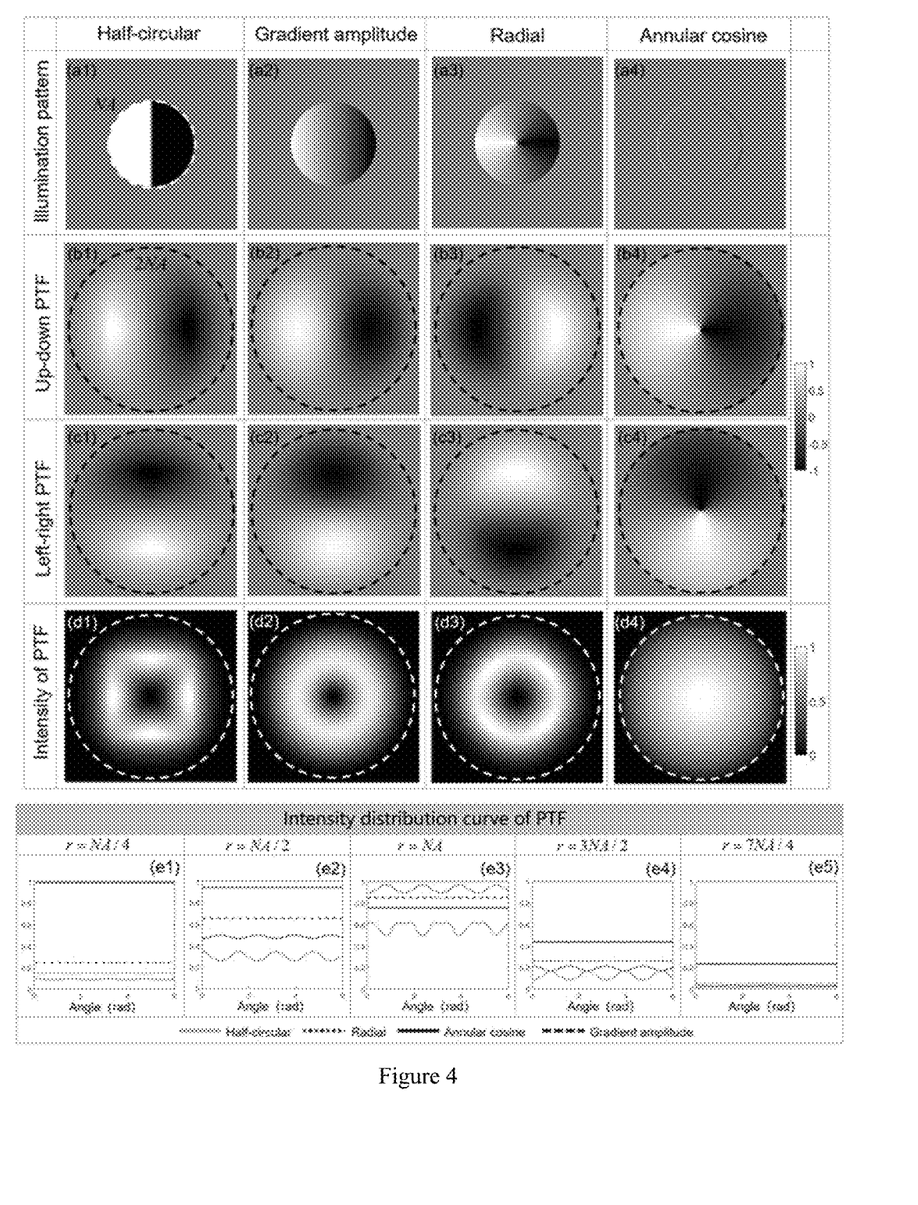
FIG. 4 shows the simulation results of the PTF of the DPC QPI for four lighting patterns.

In order to verify the imaging performance of DPC QPI under the optimal lighting pattern, we simulated the PTFs under four different lighting patterns. As shown in FIG. 4, FIGS. 4(a1)-4(a4) show the four lighting patterns of conventional semi-circular lighting, radial lighting, amplitude gradient mask lighting, and optimal lighting, respectively. Their corresponding PTFs are shown in FIGS. 4(b1)-4(b4), 4(c1)-4(c4). The PTFs in the up-down and left-right directions were superimposed to compare the isotropic performance of these lighting patterns, as shown in FIGS. 4(d1)-4(d4). It can be clearly seen that the PTF under optimal lighting has the widest frequency coverage area, and its PTF responses are greatly enhanced from 0 to 2 $NA_{obj}$ (the entire imaging bandwidth). Observing the PTFs obtained in the first three lighting patterns, FIGS. 4(d1)-4(d3) have a large number of zero values in the low-frequency region, which will lead to poor contrast of the imaging results. The low-frequency component of the PTF under optimal lighting shown in FIG. 4(d4) is significantly enhanced, which will significantly improve the low-frequency phase transfer performance. In addition, the PTF distributions under semi-circular and radial lighting do not satisfy isotropy. Obviously, the symmetric and isotropic PTFs can be obtained under amplitude gradient mask lighting and optimal lighting. In order to quantitatively analyze the PTF of each lighting patterns, we select five frequencies at NA/4, NA/2, NA, 3 NA/2, and 7 NA/4 to plot the response profiles in FIGS. 4(e1)-4(e5). It can be seen that the PTF under the optimal lighting has the optimal response for almost all frequency components, which means that it has the best transfer characteristics for almost all frequencies information of the phase. This simulation result indicates that the optimal lighting scheme proposed in this patent effectively avoids the absence of the frequency components of the DPC QPI, allowing the high-contrast, high-resolution QPI.

Figure 5:
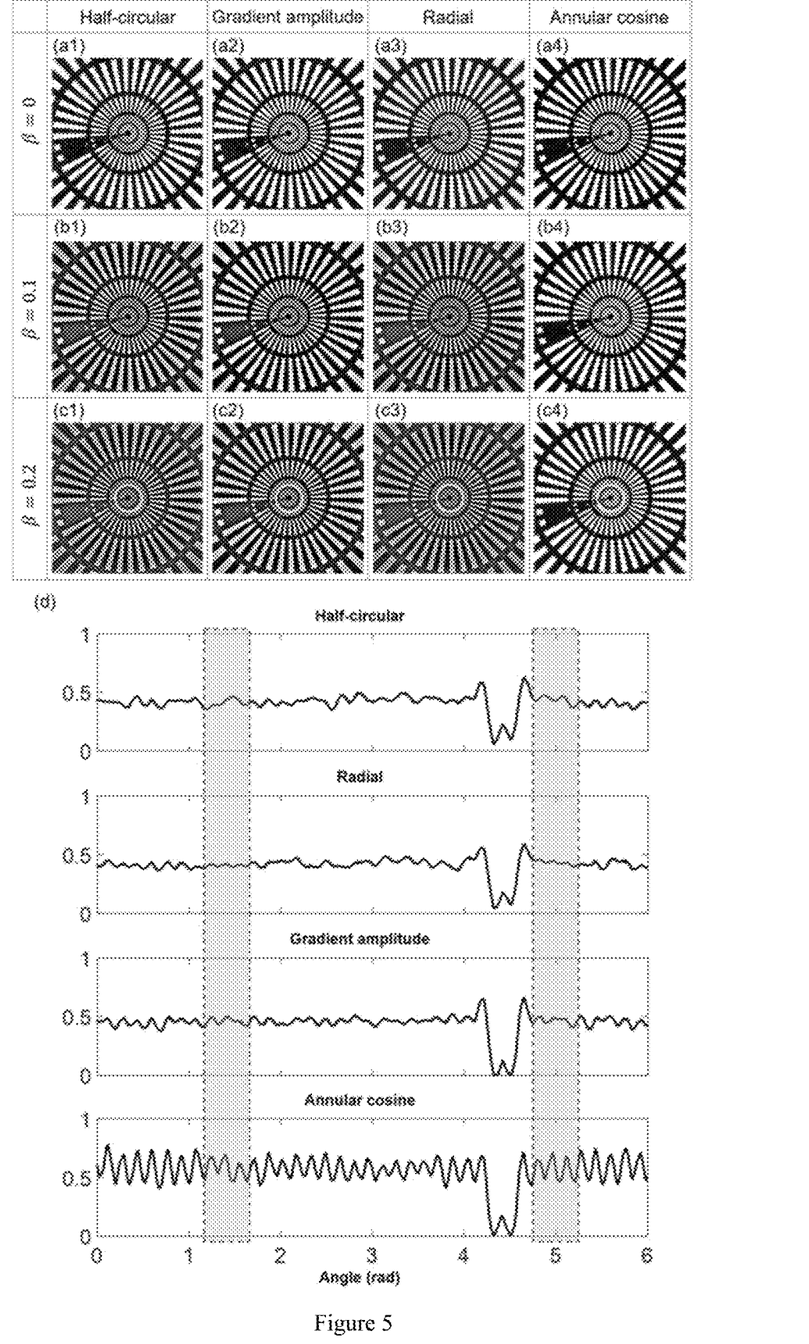
FIG. 5 shows the simulation results of the DPC with different regularization conditions under four lighting patterns.

To further simulate the imaging performance of the optimal lighting patterns in a real system, we added the same level of Gaussian noise to the raw images to simulate the imaging in a real situation. The regularization parameter β is used to suppress the system noise during the deconvolution with the Tikhonov criterion. FIGS. 5(a1)-5(a4) display the reconstructed quantitative phase from noisy images in different lighting patterns when β is set as 0. Because there are a large number of zero values in the low-frequency region of the PTF, the image noise under semi-circular lighting, radial lighting and amplitude gradient mask lighting is further amplified, resulting in severe distortion of the phase results. Optimal lighting significantly relaxes the noise sensitivity of DPC imaging. As shown in FIG. 5(a4), the reconstructed phase is anti-noise and undistorted. Then we select different regularization parameters β in the deconvolution process to suppress the noise in the imaging process, and the results are shown in FIGS. 5(b1)-5(b3) and 5(c1)-5(c3). Although the noise of the imaging results in the first three lighting patterns is suppressed, the low-frequency phase is still difficult to be recovered correctly. In order to obtain desired phase results, more appropriate regularization parameters must be selected. However, the regularization parameters are usually determined without a reliable theoretical basis and can only be done empirically. This problem is solved by optimal lighting. It can be seen from FIGS. 5(a4), 5(b4), and 5(c4), the optimal lighting can obtain desired imaging results with different regularization parameters. In summary, we can conclude that DPC QPI with the optimal lighting pattern not only yields better image contrast and higher imaging resolution, but also has more desirable anti-noise capability.

Figure 6:
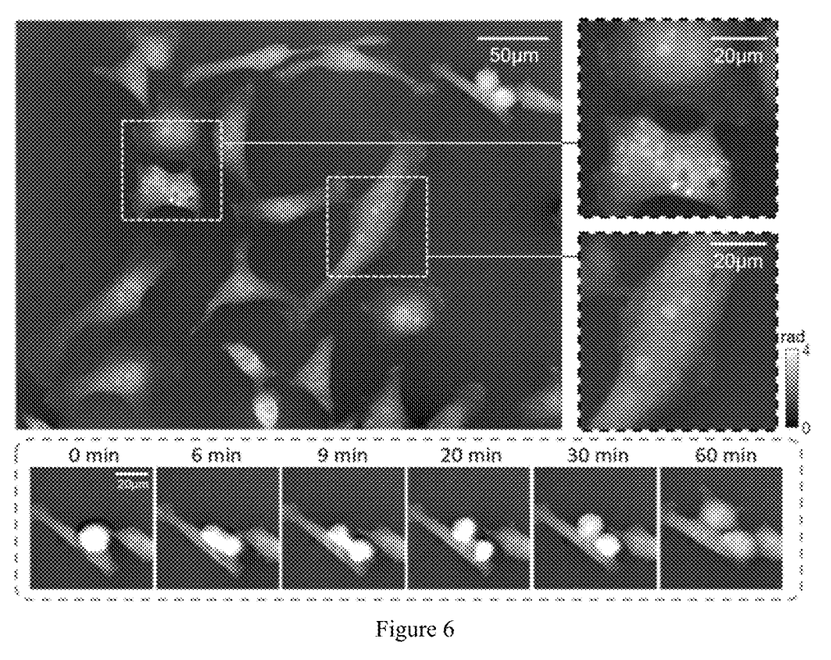
FIG. 6 shows the reconstructed phase of DPC QPI of unstained Hela cells under the optimal lighting pattern at 10× objective.

Finally, we verified the imaging performance of DPC QPI in optimal lighting pattern by an experiment on unstained Hela cells cultured in vitro. Raw experimental data were collected using an objective with 10×, 0.4 NA, and the recovered quantitative phase is shown in FIG. 6. Enlarging the subregion in FIG. 6(a) to display the cell details, as shown in FIGS. 6(b) and 6(c). It can be observed that subcellular details of the cells, such as vesicles, are clearly recovered. Further, we selected a cell to present its entire cell division process, and the time-lapse movie is shown in FIG. 6(d). These high-resolution phase images clearly reveal the cell morphological changes during different mitosis phases.

The invention claimed is:

1. A differential phase contrast (DPC) quantitative phase imaging (QPI) method based on an optimal lighting pattern design, comprising:
  a step 1 of designing the optimal lighting pattern, comprising the step of:
    deriving a lighting pattern corresponding to an isotropic phase transfer function (PTF) in the DPC QPI to be the optimal lighting pattern, wherein the optimal lighting pattern is a semi-annular lighting with a lighting numerical aperture (NA) $NA_{ill}$ equal to an objective NA $NA_{obj}$, and wherein when the NA of an objective is expressed as $NA_{obj}$, a distance between a single LED on a lighting annulus and a light axis is d, and an angle between a light emitted by the single LED and an optical axis is $a_i$, then the lighting $NA_{ill}$ obtained by the single LED on an annular pattern satisfies the following equation:

$$NA_{ill} = \sin \alpha_i = \sin\left(\arctan\frac{d}{h}\right) = NA_{obj},$$

wherein a lighting intensity distribution S of the optimal lighting pattern varies with an angle θ of lighting, and an expression in polar coordinates is expressed as:
    $S(\theta)=\cos(\theta)$ where the angle θ increases in a clockwise direction;
  a step 2 of capturing original images under optimal lighting, comprising:
    using computer-controlled LCD or high-density programmable LED arrays to display four optimal lighting patterns under a two-axis lighting generating synchronous trigger signals to a camera to acquire an image under each of the four optical lighting patterns; and
    recording a total of four original images $I_l$, $I_r$, $I_u$, and $I_d$, wherein $I_l$ and $I_r$ represent two images in left and right axis directions, and $I_u$ and $I_d$ represent two images in up and down axis directions;
  a step 3 of calculating, according to a formula for DPC imaging, a phase gradient image of a specimen in a left-right direction $I_{lr}=(I_l-I_r)/(I_l+I_r)$ and an up-down direction $I_{ud}=(I_u-I_d)/(I_u+I_d)$ under optimal lighting;
  a step 4 of solving a phase transfer function (PTF) of the optimal lighting pattern, wherein the PTF of optimal lighting pattern $PTF_{lr}(u)$ and $PTF_{ud}(u)$ are isotropic, and wherein in the polar coordinate system, when $r_a$ is a distance from any point to a center zero frequency in a PTF distribution, and $r_{NA}$ is a distance from a cut-off frequency to the center zero frequency in a frequency domain under a partially coherent imaging, then the PTF in the left-right direction is obtained as follows:

$$PTF_{lr}(u) = PTF_{lr}(r, \theta) = 2\sqrt{1 - \frac{r_a^2}{r_{NA}^2}} \cos\theta,$$

the PTF in the up-down direction is:

$$PTF_{ud}(u) = PTF_{ud}(r, \theta) = 2\sqrt{1 - \frac{r_a^2}{r_{NA}^2}} \cos\theta, \text{ and}$$

an intensity distribution thereof is expressed as:

$$|PTF_{lr}(r,\theta)|^2 + |PTF_{ud}(r,\theta)|^2 = 4 - \frac{r_a^2}{r_{NA}^2}; \text{ and}$$

a step 5 of solving a quantitative phase of the specimen by performing a deconvolution (Tikhonov criterion) with a two-axis PTF and corresponding phase gradient images to obtain a final reconstructed quantitative phase result.

2. The method according to claim 1, wherein a process of determining the intensity distribution of the optimal light pattern in the step 1 is characterized as follows:

in polar coordinates, the PTF is defined as PTF(r,θ), where r denotes a distance from a point to a center point of the PTF distribution, θ denotes an angle between the point and an axis direction;

achieving an isotropic PTF requires a minimum of two axes of lighting which are required to satisfy:

$$|PTF_{lr}(r,\theta)|^2 + |PTF_{ud}(r,\theta)|^2 = C_r,$$

where $PTF_{lr}(r,\theta)$ and $PTF_{ud}(r,\theta)$ denote the PTFs in the left-right and up-down axis directions, respectively, $C_r$ is a constant only related to r;

in polar coordinates, the PTF is a periodic function and thus can perform a Fourier series expansion to yield the following expression:

$$PTF(r,\theta) = \sum_{n=1}^{\infty}[a_n\cos(n\theta) + b_n\sin(n\theta)],$$

where $a_n$ and $b_n$ in coefficient terms independent of r and θ, and n is an arbitrary positive integer; to satisfy $|PTF_{lr}(r,\theta)|^2 + |PTF_{ud}(r,\theta)|^2 = C_r$, $|PTF_{lr}(r,\theta)|^2$ and $|PTF_{ud}(r,\theta)|^2$ cannot produce any cross term, then an expression of $PTF_{lr}(r,\theta)$ can be obtained as follows:

$$PTF_{lr}(r,\theta)=a_n\cos(n\theta) \text{ or } PTF_{lr}(r,\theta)=b_n\sin(n\theta),$$

wherein the two lighting axes of DPC are perpendicular to each other, and the PTFs thereof differ by π/2rad; and wherein when $PTF_{lr}(r,\theta)=a_n\cos(n\theta)$, $PTF_{ud}(r,\theta)=b_n\sin(n\theta)$, and when $PTF_{lr}(r,\theta)=b_n\sin(n\theta)$, $PTF_{ud}(r,\theta)\cos(n\theta)$;

when using a light source with a lighting NA equal to the objective $NA_{obj}$, an intensity distribution of the light source is expressed as S(θ) which, in the polar coordinate system, is required to satisfy three constraints: (a) S(θ) is an even function about the direction axis; (b) S(θ) is a periodic function about the angle θ; (c) S(θ) is symmetric about a point (π/2,0), and the intensity distribution of the light source is obtained by:

$$S(\theta)=k_n\cos(n\theta)$$

where $k_n$, is an arbitrary constant, and the optimal lighting pattern is an annular lighting whose lighting intensity varies with the cosine of the lighting angle; and in a process of phase recovery, considering a minimum number of over-zero points, an intensity distribution of the optimal lighting pattern is determined as:

$$S(\theta)=\cos(\theta),$$

wherein the angle θ increases in a clockwise direction.

3. The method according to claim 1, wherein the step 2 further comprises using a LCD or high-density LED array to generate the optimal lighting pattern, wherein in a LCD-based system, a lighting system consists of the light source and the LCD, and the LCD is used to adjust the lighting pattern and wherein in a LED-based system, the LED array is considered as the lighting source to directly display optimal lighting pattern by computer control.

4. The method according to claim 1, wherein the derivation of the optimal lighting in the step 4 further comprises:

imaging a thin pure phase specimen with a complex transmittance function of $t(r)=e^{-a(r)+i\phi(r)}$ which is illuminated by a single angle tilted lighting of $S(u_j)$, where r=(x, y) indicates coordinates of a specimen plane, φ(r) represents a phase of the specimen, $u_j$ represents a phase shift corresponding to a single angular lighting in the frequency domain;

introducing a weak phase approximation in order to analyze the specimen phase and intensity independently, and to simplify a complex amplitude distribution of the specimen as t(r)=1+a(r)+iφ(r), wherein Fourier transform of the complex amplitude distribution in a camera plane can be expressed as:

$$W_j(u)=\sqrt{S(u_j)}[\delta(u-u_j)-A(u-u_j)+i\Phi(u-u_j)]P(u)$$

where u denotes a frequency component in the frequency domain, A(u) denotes an amplitude distribution of the specimen in the frequency domain, Φ(u) denotes a phase distribution of the specimen in the frequency domain; P(u) is a pupil function of an objective lens;

obtaining a spectral distribution of an intensity image acquired by the camera under a single angular tilt lighting $$I_j(u)=W_j(u)\otimes W_j^*(u)=S(u_j)\delta(u)|P(u)|^2-S(u_j)A(u)[P^*(u_j)P(u+u_j)+P(u_j)P^*(u+u_j)]+iS(u_j)\Phi(u)[P^*(u_j)P(u+u_j)-P(u_j)P^*(u+u_j)]$$

calculating the intensity distribution in the frequency domain under complex lighting, wherein the intensity spectrum distribution can be divided into three terms (ignoring higher-order convolution terms of a computational process):

$$I(u)=B\delta(u)+A(u)ATF(u)+i\Phi(u)PTF(u)$$

where B represents a background term $B=\iint S(u_j)|P(u_j)|^2 d^2 u_j$; ATF(u) denotes an amplitude transfer function, and PTF(u) denotes the PTF;

wherein a general expression for the PTF under complex lighting, applicable to all lighting patterns light pupil functions, is expresses as follows:

$$PTF(u)=\iint S(u_j)[P^*(u_j)P(u+u_j)-P(u_j)P^*(u-u_j)]d^2u_j$$

wherein DPC uses asymmetric lighting patterns in up-down and left-right axis directions to illuminate the specimen, such that a tilted lighting introduces a phase factor that converts a invisible specimen phase into a measurable intensity, wherein a simple differential calculation procedure is used to highlight the phase contrast of the specimen, and the corresponding PTF is expressed as:

$$PTF_{lr}(u) = \frac{\iint S_{lr}(u_j)[P^*(u_j)P(u+u_j) - P(u_j)P^*(u-u_j)]d^2u_j}{\iint |S_{lr}(u_j)||P(u_j)|^2 d^2 u_j},$$

where $PTF_{lr}(u)$ denotes the PTF in the left-right axis directions, $S_{lr}(u_j)$ denotes the lighting in the left-right direction, and wherein the PTF in the up-down direction $PTF_{ud}(u)$ is derived as above process.

5. The method according to claim 1, wherein the step 5 further comprises a phase recovery under optimal lighting by performing a deconvolution (Tikhonov criterion) using two-axis PTF including $PTF_{lr}(u)$ and $PTF_{ud}(u)$, and corresponding phase gradient images to obtain the final reconstructed quantitative phase results:

$$\phi(r) = F^{-1}\left\{\frac{\sum_i [PTF_i^{DPC*}(u) I_i^{DPC*}(u)]}{\sum_i |PTF_i^{DPC*}(u)|^2 + \beta}\right\},$$

where $\phi(r)$ is a final reconstructed quantitative phase of the specimen.

6. The method according to claim 5, wherein in the phase recovery under optimal lighting, when solving a quantitative phase of the specimen under the Tikhonov criterion, a regularization parameter $\beta$ is a zero value.

* * * * *